(12) United States Patent
Higuchi et al.

(10) Patent No.: US 7,913,560 B2
(45) Date of Patent: Mar. 29, 2011

(54) ANGULAR RATE SENSOR AND ELECTRONIC DEVICE

(75) Inventors: Takamitsu Higuchi, Matsumoto (JP); Yasuhiro Ono, Suwa (JP)

(73) Assignee: Seiko Epson Corporation (JP)

( * ) Notice: Subject to any disclaimer, the term of this patent is extended or adjusted under 35 U.S.C. 154(b) by 462 days.

(21) Appl. No.: 12/050,228

(22) Filed: Mar. 18, 2008

(65) Prior Publication Data

US 2008/0229824 A1 Sep. 25, 2008

(30) Foreign Application Priority Data

Mar. 19, 2007 (JP) .................... 2007-070022

(51) Int. Cl.
*G01P 9/04* (2006.01)
*G01C 19/56* (2006.01)
(52) U.S. Cl. .................. 73/504.16; 73/504.12
(58) Field of Classification Search ............. 73/504.16, 73/504.12, 504.04, 504.15, 504.14; 310/370
See application file for complete search history.

(56) References Cited

U.S. PATENT DOCUMENTS

| | | | | |
|---|---|---|---|---|
| 3,206,986 A | * | 9/1965 | Christensen | 73/504.16 |
| 5,166,571 A | * | 11/1992 | Konno et al. | 310/333 |
| 5,585,562 A | * | 12/1996 | Kurata et al. | 73/504.16 |
| 6,134,962 A | * | 10/2000 | Sugitani | 73/504.16 |
| 6,666,091 B2 | * | 12/2003 | Hatanaka et al. | 73/504.16 |
| 7,227,667 B2 | * | 6/2007 | Ikeda | 358/1.9 |
| 7,260,990 B2 | * | 8/2007 | Ohuchi et al. | 73/504.12 |
| 2003/0084723 A1 | * | 5/2003 | Kikuchi et al. | 73/504.12 |
| 2005/0061073 A1 | * | 3/2005 | Kanna et al. | 73/504.04 |
| 2006/0117851 A1 | * | 6/2006 | Ohuchi et al. | 73/504.16 |

FOREIGN PATENT DOCUMENTS

| | | |
|---|---|---|
| JP | 10-019574 | 1/1998 |
| JP | 10-170274 | 6/1998 |
| JP | 2001-194149 | 7/2001 |
| JP | 2005-241382 | 9/2005 |
| JP | 2005-249395 | 9/2005 |
| JP | 2005-291858 | 10/2005 |
| JP | 2006-030062 | 2/2006 |

* cited by examiner

*Primary Examiner* — Helen C. Kwok
(74) *Attorney, Agent, or Firm* — Harness, Dickey & Pierce, P.L.C.

(57) ABSTRACT

An angular rate sensor includes a piezoelectric vibration device; and a detection section, wherein the piezoelectric vibration device includes a vibration section having a first support section, four (first-fourth) cantilever sections supported by the first support section, and a second support section that supports the first support section. The detection section is formed above the vibration section for detecting an angular rate of rotation applied to the vibration section, and has a lower electrode, a piezoelectric layer formed above the lower electrode, and an upper electrode formed above the piezoelectric layer.

10 Claims, 4 Drawing Sheets

ANGULAR RATE SENSOR AND ELECTRONIC DEVICE

The entire disclosure of Japanese Patent Application No. 2007-070022, filed Mar. 19, 2007 is expressly incorporated by reference herein.

BACKGROUND

1. Technical Field

The present invention relates to angular rate sensors and electronic devices.

2. Related Art

Information devices, such as, digital cameras and car navigation systems carry an angular rate sensor in order to prevent blurring of images due to hand movement or to detect the position of a vehicle. As the angular rate sensor, for example, a 32 kHz tuning-fork quartz oscillator is still used as it can utilize the existing design resource and energy saving properties. However, when forming a 32 kHz tuning-fork quartz oscillator, the length of the prongs of the tuning fork becomes as large as several millimeters, whereby the entire length including the package becomes as large as almost 10 mm.

In recent years, piezoelectric vibration devices that use a driving section having a piezoelectric thin film interposed between upper and lower electrodes and formed on a silicon substrate, instead of quartz, have been developed. Known structures of such piezoelectric vibration devices include a beam type structure (see FIG. 1 of JP-A-2005-291858) and a structure having a tuning fork vibration device formed with two beams (see FIG. 1 of JP-A-2005-249395) are known. When utilizing such piezoelectric vibration devices, since the thickness of a silicon substrate can only be reduced to about 100 μm, the prong length of the beams may become as much as several millimeters or greater in order to obtain a resonance frequency at several tens kHz. This makes it difficult to reduce the size of the angular rate sensor having such a piezoelectric vibration device.

SUMMARY

In accordance with an aspect of the present invention, there is provided an angular rate sensor having a piezoelectric vibration device that can be reduced in size, can be driven at a desired resonance frequency, and can obtain a high Q value. In accordance with another aspect of the present invention, an electronic device having the aforementioned angular rate sensor can be provided.

An angular rate sensor in accordance with an embodiment of the invention includes:

a piezoelectric vibration device, and a detection section, wherein the piezoelectric vibration device includes a base substrate, a vibration section having a fixed end affixed to the base substrate and a free end that does not contact the base substrate, and a driving section formed above the vibration section for generating flexural vibration of the vibration section;

the vibration section has a first support section, four (first-fourth) cantilever sections supported by the first support section, and a second support section that supports the first support section and equipped with the fixed end;

the first support section has two center lines that are orthogonal to each other;

the first cantilever section and the second cantilever section are symmetrical to each other through one of the center lines of the first support section in a plan view;

the third cantilever section and the fourth cantilever section are symmetrical to each other through the one of the center lines of the first support section in a plan view;

the first cantilever section and the fourth cantilever section are symmetrical to each other through the other of the center lines of the first support section in a plan view;

the second cantilever section and the third cantilever section are symmetrical to each other through the other of the center lines of the first support section in a plan view;

the driving section includes a lower electrode for driving section, a piezoelectric layer for driving section formed above the lower electrode for driving section, and an upper electrode for driving section formed above the piezoelectric layer for driving section; and the detection section is formed above the vibration section for detecting an angular rate of rotation applied to the vibration section, and has a lower electrode for detection section, a piezoelectric layer for detection section formed above the lower electrode for detection section, and an upper electrode for detection section formed above the piezoelectric layer for detection section.

According to the piezoelectric vibration device of the angular rate sensor in accordance with the present embodiment, its resonance frequency depends on the thickness of the vibration section. Therefore, according to the piezoelectric vibration device, its resonance frequency can be adjusted by the thickness of the vibration section. For example, if the vibration section has a tuning fork shape, the resonance frequency depends on the width of the vibration section. Therefore, in the case of the tuning fork shape piezoelectric vibration device, it is possible to lower the resonance frequency by narrowing the width of the vibration section. But in this case, there may be a limitation in the processing technology. In contrast, according to the piezoelectric vibration device in accordance with the present embodiment, it is possible to lower the resonance frequency by reducing the thickness of the vibration section. Therefore, a desired resonance frequency can be obtained regardless of the limitation in the processing technology. In other words, the angular rate sensor having the piezoelectric vibration device in accordance with the embodiment of the invention can be made smaller in size than, for example, a tuning fork shaped angular rate sensor, and can be driven at a desired resonance frequency (for example, at several tens kHz). Also, according to the piezoelectric vibration device of the angular rate sensor in accordance with the embodiment of the invention, stress does not concentrate at a connection section between the vibration section and the base substrate (more specifically, at the fixed end of the vibration section), such that a high Q value can be obtained.

It is noted that, in the descriptions concerning the invention, the term "above" may be used, for example, as "a specific element (hereafter referred to as "A") is formed 'above' another specific element (hereafter referred to as "B")." In the descriptions concerning the invention, in this case, the term "above" is used, assuming that it include a case in which A is formed directly on B, and a case in which A is formed above B through another element.

In the angular rate sensor in accordance with an aspect of the invention, the first support section and the four cantilever sections may form a letter H shape in a plan view, and the first support section and the second support section may form a letter T shape in a plan view.

In the angular rate sensor in accordance with an aspect of the invention, the first cantilever section and the second cantilever section may be connected to one end section of the first support section, and the third cantilever section and the fourth cantilever section may be connected to the other end section of the first support section.

In the angular rate sensor in accordance with an aspect of the invention, the second support section may be connected to an end point of the first support section in a shortest distance from a center point of the first support section in a plan view.

In the angular rate sensor in accordance with an aspect of the invention, the first support section, the cantilever sections and the second support section may each have a cuboid configuration.

In the angular rate sensor in accordance with an aspect of the invention, the detection section may include a pair of detection sections formed above each of the cantilever sections, and the driving section may be formed above each of the cantilever sections between the pair of detection sections.

In the angular rate sensor in accordance with an aspect of the invention, the base substrate may include a substrate, an insulation section formed above the substrate, and a semiconductor section formed above the insulation section, wherein the vibration section may be formed from a semiconductor that is the same semiconductor composing the semiconductor section.

In the angular rate sensor in accordance with an aspect of the invention, the base substrate may be a SOI (silicon on insulator) substrate.

In the angular rate sensor in accordance with an aspect of the invention, the base substrate may be a semiconductor substrate, and the vibration section may be formed from a semiconductor that is the same semiconductor composing the semiconductor substrate.

An electronic device in accordance with an embodiment of the invention includes the angular rate sensor described above.

DESCRIPTION OF EXEMPLARY EMBODIMENTS

Preferred embodiments of the present invention are described below with reference to the accompanying drawings.

Figure 1:
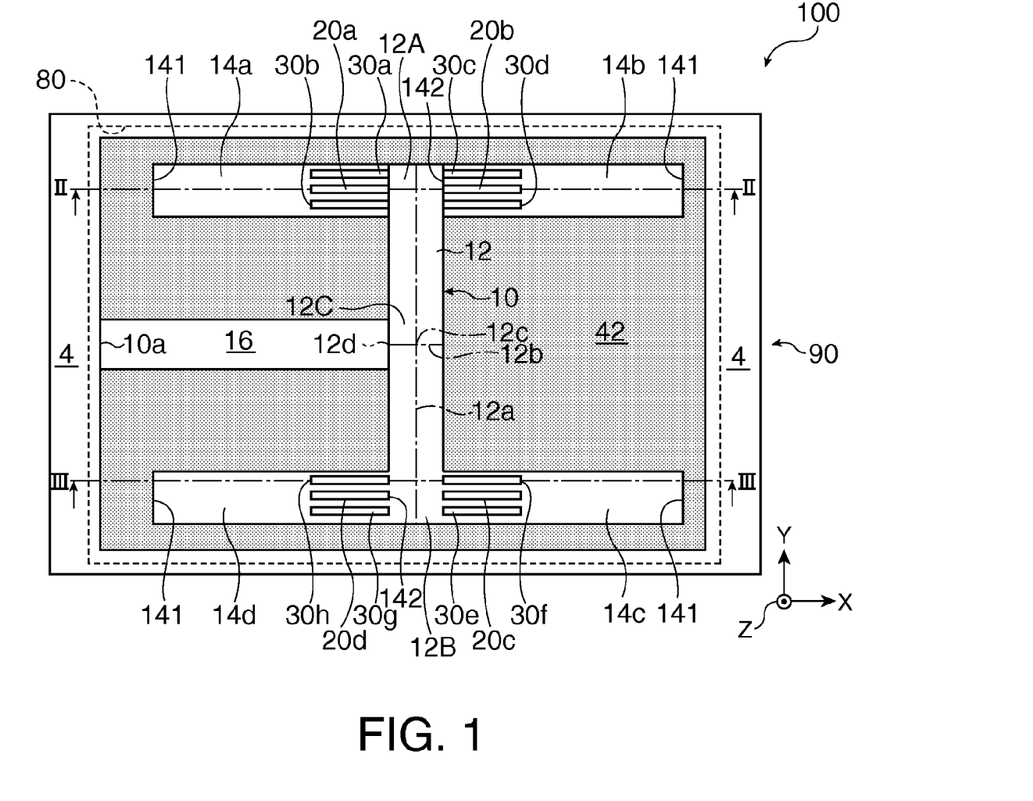
FIG. 1 is a schematic plan view of an angular rate sensor in accordance with an embodiment of the invention.
Figure 2:
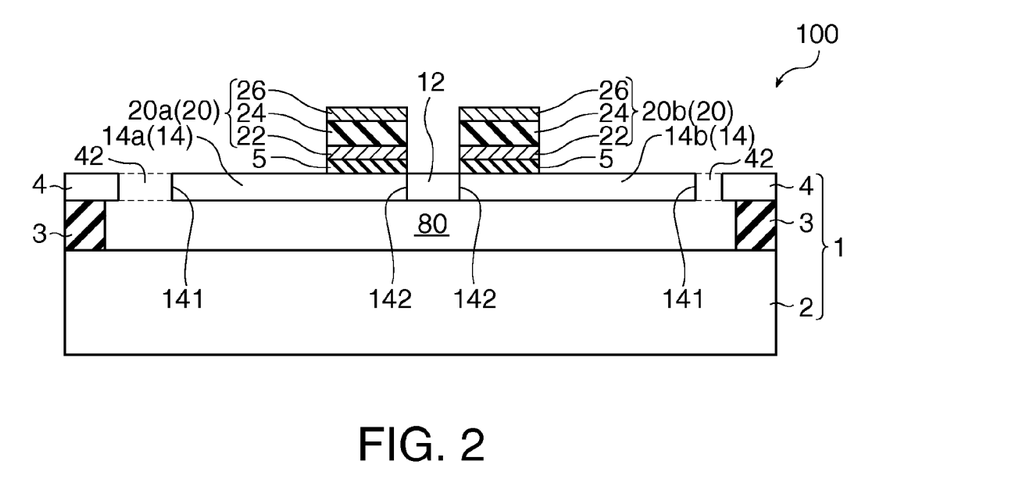
FIG. 2 is a schematic cross-sectional view of the angular rate sensor in accordance with the present embodiment.
Figure 3:
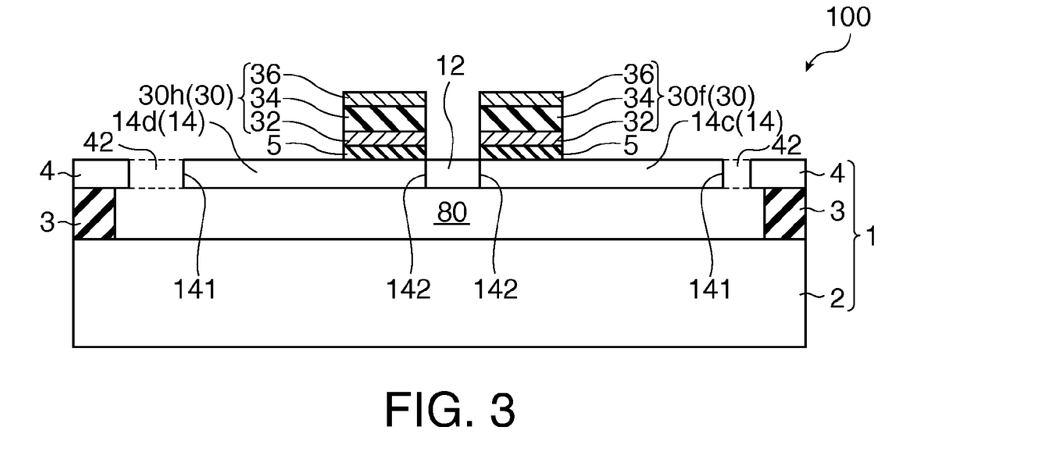
FIG. 3 is a schematic cross-sectional view of the angular rate sensor in accordance with the present embodiment.

1. First, an angular rate sensor 100 in accordance with an embodiment of the invention is described. FIG. 1 is a schematic plan view of the angular rate sensor 100 of the present embodiment, and FIG. 2 and FIG. 3 are schematic cross-sectional views of the angular rate sensor 100. FIG. 2 is a cross-sectional view taken along a line II-II of FIG. 1, and FIG. 3 is a cross-sectional view taken along a line III-III of FIG. 1.

The angular rate sensor 100 includes a piezoelectric vibration device 90 and detection sections 30 (30a-30d), as shown in FIGS. 1-3. The piezoelectric vibration device 90 includes a base substrate 1, a vibration section 10 and driving sections 20 (20a-20d).

The base substrate 1 has, for example, a substrate 2, an insulation section 3 formed on the substrate 2, and a semiconductor section 4 formed on the insulation section 3, as shown in FIG. 2 and FIG. 3. As the base substrate 1, for example, a SOI (silicon on insulator) substrate may be used. As the SOI substrate, for example, a SIMOX (silicon implanted oxide) substrate and a laminated SOI substrate may be used. For example, a silicon substrate may be used as the substrate 2, a silicon oxide layer may be used as the insulation section 3, and a silicon layer may be used as the semiconductor section 4. A variety of semiconductor circuits may be fabricated in the semiconductor section 4. The use of a silicon layer as the semiconductor section 4 is advantageous because ordinary semiconductor manufacturing technologies can be used. The thickness of the insulation section 3 may be, for example, 0.1 µm-4 µm, and the thickness of the semiconductor section 4 may be, for example, 1 µm-4 µm.

The semiconductor section 4 may support the vibration section 10. The semiconductor section 4 may be formed in a rectangular frame shape, for example, as shown in the figure.

The vibration section 10 has a fixed end 10a that is affixed to the base substrate 1 (more specifically to the semiconductor section 4), and free ends 141 that do not contact the base substrate 1 (more specifically the semiconductor section 4). The vibration section 10 may be made of semiconductor. The semiconductor composing the vibration section 10 may be, for example, the same semiconductor composing the semiconductor section 4.

The vibration section 10 has a first support section 12, four cantilever sections 14 (14a-14d) supported by the first support section 12, and a second support section 16 that supports the first support section 12 and is equipped with the fixed end 10a of the vibration section 10.

Each of the cantilever sections 14 has a fixed end 142 that is affixed to the first support section 12, and a free end 141 that does not contact the base substrate 1 (more specifically, the semiconductor section 4). It is noted that the free ends 141 of the cantilever sections 14 are also the free ends 141 of the vibration section 10.

The first support section 12 has two center lines 12a and 12b that are orthogonal to each other. One of the center lines 12a of the first support section 12 extends along the lengthwise direction (Y direction in FIG. 1) of the first support section 12. The other of the center lines 12b of the first support section 12 extends along the widthwise direction (X direction) of the first support section 12.

The first cantilever section 14a and the second cantilever section 14b are symmetrical with each other through one of the center lines 12a of the first support section 12, in a plan view (FIG. 1). Similarly, the third cantilever section 14c and the fourth cantilever section 14d are symmetrical with each other through one of the center lines 12a of the first support section 12, in a plan view (FIG. 1). The first cantilever section 14a and the fourth cantilever section 14d are symmetrical with each other through the other of the center lines 12b of the first support section 12. Similarly, the second cantilever section 14b and the third cantilever section 14c are symmetrical with each other through the other of the center lines 12b of the first support section 12.

The first support section 12 and the four cantilever sections 14 (14a-14d) may form, for example, a letter H shape, in a plan view (FIG. 1). The first cantilever section 14a and the second cantilever section 14b are connected to, for example, one end section 12A of the first support section 12. The third cantilever section 14c and the fourth cantilever section 14d are connected to, for example, the other end section 12B of the first support section 12. It is noted that the cantilever sections 14a-14d may be connected to portions of the first support section 12 other than the end sections 12A and 12B.

The lengthwise direction (X direction) of each of the cantilever sections 14 is orthogonal to the lengthwise direction (Y direction) of the first support section 12. Each of the first support section 12 and the cantilever sections 14a-14d may have, for example, a cuboid shape. The first support section 12 has a plane configuration that may be, for example, rectangular (oblong or square), and is oblong in the illustrated example. Each of the cantilever sections 14a-14d has a plane configuration that may be, for example, rectangular, triangular or trapezoidal, and is oblong in the illustrated example.

The first cantilever section 14a and the fourth cantilever section 14d are disposed, for example, in parallel with the lengthwise direction (X direction) of the cantilever sections 14 at a predetermined interval. Similarly, the second cantilever section 14b and the third cantilever section 14c are disposed, for example, in parallel with the lengthwise direction (X direction) of the cantilever sections 14 at a predetermined interval. The separation between the first cantilever section 14a and the fourth cantilever section 14d is equal to the separation between the second cantilever section 14b and the third cantilever section 14c.

The length of each of the cantilever sections 14 (14a-14d) is, for example, 200 μm-400 μm. The width of each of the cantilever sections 14 (14a-14d) is, for example, 50 μm. It is noted that the length of each of the cantilever sections 14 may be a distance between the fixed end 142 and the free end 141 of that cantilever section 14 in a plan view. Also, in the present invention, the width of a specific member (for example, the cantilever section 14) means a distance between two ends of the member in a direction orthogonal to the lengthwise direction of the member.

The length of the first support section 12 may be, for example, 250 μm, and the width of the first support section 12 may be, for example, 50 μm. It is noted that the length of the first support section 12 means a distance between two ends of the first support section 12 in a direction (Y direction) orthogonal to the lengthwise direction (X direction) of the cantilever sections 14.

The first support section 12 and the second support section 16 function to support the cantilever sections 14a-14d, and also function to prevent vibrations of the cantilever sections 14a-14d from propagating to the base substrate 1. The first support section 12 and the second support section 16 may form, for example, a letter T shape, in a plan view. The second support section 16 is at least connected to an end point 12d of the first support section 12 which is located in a shortest distance from a central point 12c of the first support section 12. The central point 12c of the first support section 12 is located, for example, at a crossing between one of the center lines 12a and the other of the center lines 12b of the first support section 12. The second support section 16 is connected to, for example, a central section 12C of the first support section 12. The lengthwise direction (X direction) of the second support section 12 is, for example, orthogonal to the lengthwise direction (Y direction) of the first support section 12. The second support section 16, the first cantilever section 14a and the fourth cantilever section 14d are disposed, for example, at predetermined intervals in parallel with their lengthwise direction (X direction). The second support section 16 has, for example, a cuboid shape. The second support section 16 has a plane configuration that may be, for example, rectangular, and is oblong in the illustrated example. The plane configuration of the second support section 16 is symmetrical, for example, through the other of the center lines 12b of the first support section 12.

The length of the second support section 16 is, for example, 250 μm-450 μm. The width of the second support section 16 is, for example, 50 μm. It is noted that the length of the second support section 16 is the distance between both ends of the second support section 16 in the lengthwise direction (X direction) of the cantilever section 14.

The length of the second support section 16 is, for example, greater than the length of the cantilever sections 14. The sum of the width of the second support section 16, the width of the first cantilever section 14a and the width of the fourth cantilever section 14d is, for example, smaller than the length of the first support section 12. Also, the width of the first support section 12, the width of each of the cantilever sections 14 (14a-14d) and the width of the second support section 16 may be, for example, the same.

The vibration section 10 is formed above a void section 80 that is formed by removing a portion of the insulation section 3, as shown in FIG. 1-FIG. 3. The void section 80 has a plane configuration that may be, for example, rectangular, and is oblong in the illustrated example. The void section 80 is provided, for example, in a manner to extend under the end section of the semiconductor section 4. An opening section (first opening section) 42 that allows vibrations of the vibration section 10 is formed in a region between the vibration section 10 and the semiconductor section 4, other than a connecting section between the vibration section 10 and the semiconductor section 4 (more specifically, the fixed end 10a of the vibration section 10). The vibration section 10 is stored inside a rectangular frame formed from the semiconductor section 4.

The thickness of the vibration section 10 is the same as the thickness of the semiconductor section 4, and may be, for example, 1 μm-4 μm. The thickness of the vibration section 10 may preferably be 4 μm or less for reducing the angular rate sensor 100 in size.

For example, a base layer 5 is formed between the vibration section 10 and the driving sections 20 (more specifically, between the cantilever sections 14 and lower electrodes 22 of the driving sections), and between the driving section 10 and the detecting section 30 (more specifically, between the cantilever sections 14 and lower electrodes 32 of the detection sections). The base layer 5 may be a dielectric layer such as a silicon oxide ($SiO_2$) layer, a silicon nitride ($Si_3N_4$) layer or the like. The base layer 5 may be formed from a compound layer of two or more layers. The thickness of the base layer 5 may be, for example, 1 μm.

The driving sections 20 (20a-20d) are formed above the vibration section 10. Each of the driving sections 20 is formed, for example, above each of the cantilever sections (beams) 14a-14d. The driving sections 20 are each formed, for example, on the base layer 5. The driving sections 20 each generate flexural vibrations in the vibration section 10. For example, each one driving section 20 is provided for each of the cantilever sections 14a-14d, as shown in FIG. 1. For example, each one driving section 20 is provided between a pair of the detection sections 30. More specifically, the first driving section 20a is provided between the first detection section 30a and the second detection section 30b above the first cantilever section 14a. Similarly, the second driving section 20b is provided between the third detection section 30c and the fourth detection section 30d above the second cantilever section 14b. Similarly, the third driving section 20c is provided between the fifth detection section 30e and the sixth detection section 30f above the third cantilever section 14c. Similarly, the fourth driving section 20d is provided between the seventh detection section 30g and the eighth detection section 30h above the fourth cantilever section 14d.

The detection sections 30 (30a-30h) are each formed above the vibration section 10. Each of the detection sections 30 is formed above, for example, each of the cantilever sections (beams) 14a-14d, respectively. The detection section 30 is formed, for example, on the base layer 5. The detection section detects the rotational angular rate caused in the vibration section 10. Each one pair of detection sections 30 is provided for each of the cantilever sections 14a-14d, for example, as shown in FIG. 1. More specifically, above the first cantilever section 14a, the first detection section 30a and the second detection section 30b are formed in parallel with each other along the lengthwise direction of the first cantilever section 14a. Similarly, above the second cantilever section 14b, the third detection section 30c and the fourth detection section 30d are formed in parallel with each other along the lengthwise direction of the second cantilever section 14b. Similarly, above the third cantilever section 14c, the fifth detection section 30e and the sixth detection section 30f are formed in parallel with each other along the lengthwise direction of the third cantilever section 14c. Similarly, above the fourth cantilever section 14d, the seventh detection section 30g and the eighth detection section 30h are formed in parallel with each other along the lengthwise direction of the fourth cantilever section 14d. The first-eighth detection sections 30a-30h are connected to a detection circuit (not shown) that detects angular rate signals.

The plane configuration of the driving section 20 and the detection section 30 may be, for example, rectangular, and is oblong in the illustrated example, and its lengthwise direction is the same direction (X direction) as the lengthwise direction of the vibration section 10. The driving section 20 and the detection section 30 are formed, for example, on the cantilever section 14 on its base side (fixed end side), as shown in FIG. 1-FIG. 3. The driving section 20 and the detection section 30 are provided in a manner that, for example, one ends of the driving section 20 and the detection section 30 in the lengthwise direction (X direction) align with the fixed end 142 of the cantilever section 14, in a plan view. It is noted that, although not shown, a portion of the driving section 20 and a portion of the detection section 30 may be formed, for example, on the first support section 12. The length of each of the driving sections 20 (20a-20d) and the detection sections 30 (30a-30h) may be, for example, 200 μm, and the width of each of the driving sections 20 and the detection sections 30 may be, for example, 50 μm. It is noted that the length of the driving section 20 (or the detection section 30) means a distance between two ends of the driving section 20 (or the detection section 30) in the lengthwise direction (X direction) of the cantilever section 14.

As shown in FIG. 2, each of the driving sections 20 (20a-20d) has a lower electrode 22 for driving section formed above the vibration section 10 (more specifically on the cantilever section 14), a piezoelectric layer 24 for driving section formed on the lower electrode 22 for driving section, and an upper electrode 26 for driving section formed on the piezoelectric layer 24 for driving section. As shown in FIG. 3, each of the detection sections 30 (30a-30h) has, as shown in FIG. 3, a lower electrode 32 for detection section formed above the vibration section 10 (more specifically, on the cantilever section 14), a piezoelectric layer 34 for detection section formed on the lower electrode 32 for detection section, and an upper electrode 36 for detection section formed on the piezoelectric layer 34 for detection section.

As the lower electrode 22 for driving section and the lower electrode 32 for detection section, for example, a platinum (Pt) layer may be used. The lower electrodes 22 and 32 may each have a thickness that can provide a sufficiently low electrical resistance value, and may have a thickness of, for example, 10 nm or more but 5 μm or less.

The piezoelectric layer 24 for driving section and the piezoelectric layer 34 for detection section may be formed from a piezoelectric material, such as, for example, lead zirconate titanate (Pb (Zr, Ti) $O_3$: PZT), lead zirconate titanate solid solution or the like. As the lead zirconate titanate solid solution, for example, lead zirconate titanate niobate (Pb (Zr, Ti, Nb) $O_3$: PZTN) may be used. The thickness of each of the piezoelectric layers 24 and 34 may preferably be about $\frac{1}{10}$ or greater to $\frac{1}{1}$ or less the thickness of the vibration section 10. The thickness in this range can secure a driving force that can sufficiently vibrate the beams. For example, when the thickness of the vibration section 10 is between 1 μm and 4 μm, the thickness of each of the piezoelectric layers 24 and 34 may be between 0.1 μm and 4 μm. The film thickness of each of the piezoelectric layers 24 and 34 may be appropriately changed according to the resonance conditions.

As the upper electrode 26 for driving section and the upper electrode 36 for detection section, for example, a platinum (Pt) layer may be used. The upper electrodes 26 and 36 may each have a thickness that can provide a sufficiently low electrical resistance value, and may have a thickness of, for example, 10 nm or more but 5 μm or less.

It is noted that, in the illustrated example, the driving section 20 has only the piezoelectric layer 24 between the lower electrode 22 and the upper electrode 26, but may have other layers in addition to the piezoelectric layer 24 between the two electrodes 22 and 26. Similarly, the detection section 30 has only the piezoelectric layer 34 between the lower electrode 32 and the upper electrode 36, but may have other layers in addition to the piezoelectric layer 34 between the two electrodes 32 and 36.

The upper electrode 26 of the first driving section 20a and one of terminals of a driving power supply (not shown) are electrically connected to each other by a wiring (not shown). The lower electrode 22 of the first driving section 20a and the lower electrode 22 of the second driving section 20b are electrically connected to each other by a wiring (not shown). The upper electrode 26 of the second driving section 20b and the upper electrode 26 of the third driving section 20c are electrically connected to each other by a wiring (not shown). The lower electrode 22 of the third driving section 20c and the lower electrode 22 of the fourth driving section 20d are electrically connected to each other by a wiring (not shown). The upper electrode 26 of the fourth driving section 20d and the other terminal of the aforementioned driving power supply are electrically connected to each other by a wiring (not shown). The first driving section 20a, the second driving section 20b, the third driving section 20c and the fourth driving section 20d are connected in series in this order. Also, a polarization treatment may be applied to the piezoelectric layers 24 of the first-fourth driving sections 20a, 20b, 20c and 20d, for example, in the state in which the upper electrodes 26 remain independent from one another before the wiring forming step, whereby the polarization directions in the vertical direction can be readily aligned in all of the piezoelectric layers 24. Accordingly, when a DC electric field is applied to the driving sections 20 (20a-20d) in this connection state, polarities in extension and contraction of the piezoelectric layer 24 of the first driving section 20a and the piezoelectric layer 24 of the second driving section 20b in the lengthwise direction (X direction) of the cantilever sections 14 become opposite to each other. Also, polarities in extension and contraction of the piezoelectric layer 24 of the second driving section 20b and the piezoelectric layer 24 of the third driving section 20c in the lengthwise direction (X direction) of the cantilever sections 14 become opposite to each other. Also, polarities in extension and contraction of the piezoelectric layer 24 of the third driving section 20c and the piezoelectric layer 24 of the fourth driving section 20d in the lengthwise direction (X direction) of the cantilever sections 14 become opposite to each other.

According to the angular rate sensor 100 in accordance with the present embodiment, by applying an alternating electric field between the upper electrode 26 of the first driving section 20a and the upper electrode 26 of the fourth driving section 20d, the first cantilever section 14a and the second cantilever section 14b can be flexurally vibrated (first flexural vibration) in an up-and-down direction (Z direction) in mutually opposite phases. Also, the second cantilever section 14b and the third cantilever section 14c can be flexurally vibrated (first flexural vibration) in an up-and-down direction in mutually opposite phases. Also, the third cantilever section 14c and the fourth cantilever section 14d can be flexurally vibrated (first flexural vibration) in an up-and-down direction in mutually opposite phases. It is noted that, in this case, the flexural vibrations of the first cantilever section 14a and the third cantilever section 14c are in the same phase, and the flexural vibrations of the second cantilever section 14b and the fourth cantilever section 14d are in the same phase.

Then, by the Coriolis force generated by the angular velocity of rotation about the center line between the first cantilever section 14a and the fourth cantilever section 14d (which is also the center line between the second cantilever section 14b and the third cantilever section 14c) as an axis, the first-fourth cantilever sections 14a-14d can be flexurally vibrated (second flexural vibration) in a direction (Y direction) perpendicular to the first flexural vibration. Accordingly, by detecting voltages of the first-eighth detection sections 30a-30h generated by the second flexural vibration) with the detection circuit, the angular rate can be obtained. It is noted that the detected voltage of the first detection section 30a and the detected voltage of the second detection section 30b are in mutually opposite phases. Similarly, the detected voltage of the third detection section 30c and the detected voltage of the fourth detection section 30d are in mutually opposite phases, the detected voltage of the fifth detection section 30e and the detected voltage of the sixth detection section 30f are in mutually opposite phases, and the detected voltage of the seventh detection section 30g and the detected voltage of the eighth detection section 30h are in mutually opposite phases.

The resonance frequency of the piezoelectric vibration device 90 in accordance with the present embodiment may preferably be 100 kHz or less. This is because the angular rate sensor exhibits increased sensitivity as the driving frequency is reduced, and resonance frequencies in a 32 kHz band are oscillation frequencies for general purposes. Resonance frequencies lower than 100 kHz can be obtained by, for example, changing the design of a 32 kHz driving circuit. It is noted that the resonance frequency in the 32 kHz band may be, for example, in the range of 16.384 kHz to 65.536 kHz. By adding a divider circuit to a 32.768 kHz ($2^{15}$ Hz: also simply referred to as "32 kHz"), the piezoelectric vibration device can be driven at 16.384 kHz ($2^{14}$ Hz), and the piezoelectric vibration device can be driven at 65.536 kHz ($2^{16}$ Hz) by adding a phase locked loop to a 32 kHz oscillator circuit.

Figure 4:
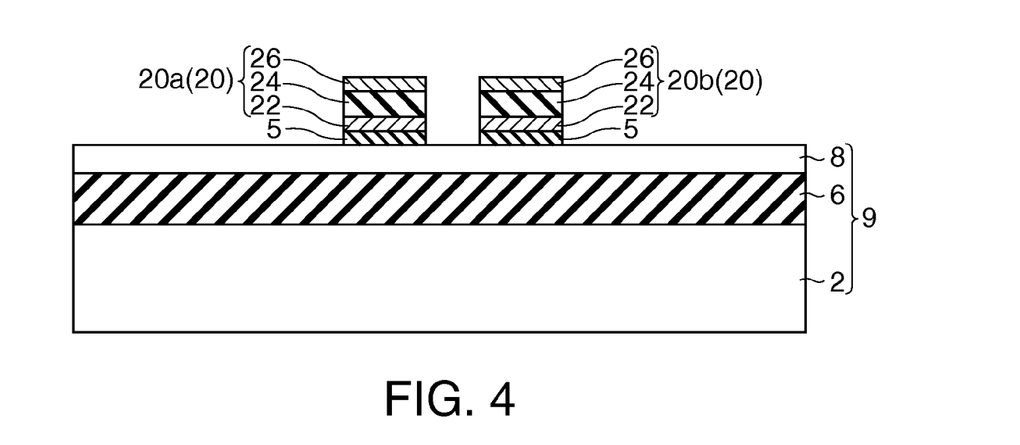
FIG. 4 is a schematic cross-sectional view showing a step of a method for manufacturing an angular rate sensor in accordance with an embodiment of the invention.
Figure 5:
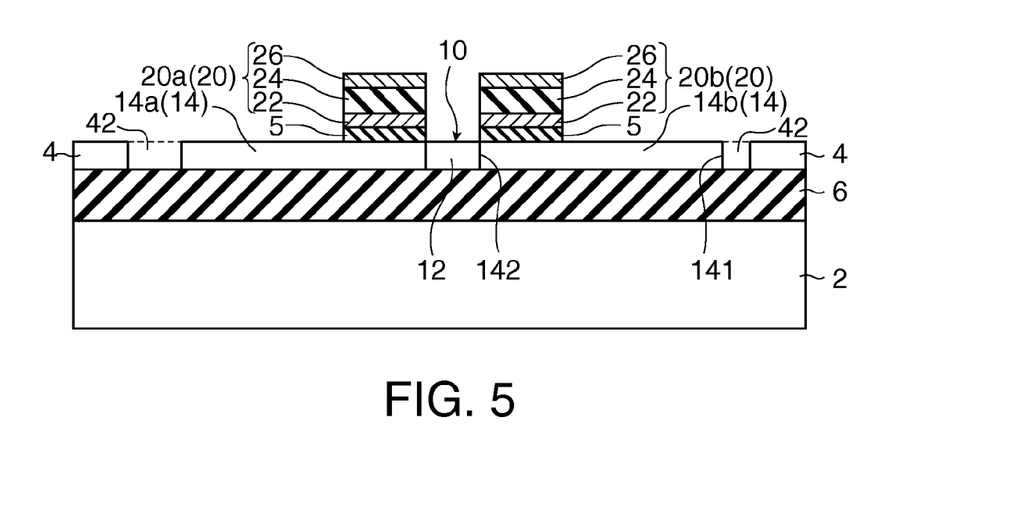
FIG. 5 is a schematic cross-sectional view showing a step of the method for manufacturing an angular rate sensor in accordance with the embodiment of the invention.

2. Next, an example of a method for manufacturing an angular rate sensor 100 in accordance with an embodiment of the invention is described with reference to the accompanying drawings. FIGS. 4 and 5 are schematic cross-sectional views showing steps in the method for manufacturing the angular rate sensor 100 in accordance with the present embodiment, and correspond to the cross-sectional view shown in FIG. 2, respectively.

(1) First, as shown in FIG. 4, a base substrate 9 having an insulation layer 6 and a semiconductor layer 8 laminated in this order on a substrate 2 is prepared. As the base substrate 9, for example, a SOI substrate may be used.

Next, a base layer 5 is formed on the entire top surface of the base substrate 9. The base layer 5 may be formed by a thermal oxidation method, a CVD (chemical vapor deposition) method, a sputter method or the like.

(2) Next, as shown in FIG. 4, driving sections 20 and detection sections 30 are formed on the base layer 5. More specifically, for example, lower electrode layers 22 and 32, piezoelectric layers 24 and 34, and upper electrode layers 26 and 36 which form the driving sections 20 and the detection sections 30 are formed in this order on the entire top surface of the base layer 5. The lower electrode layers 22 and 32 may be formed by a vapor deposition method or a sputter method. The piezoelectric layers 24 and 34 may be formed by a solution method (sol-gel method), a laser ablation method, a vapor deposition method, a sputter method, or a CVD method. The upper electrode layers 26 and 36 may be formed by a vapor deposition method, a sputter method or CVD method.

Then, the upper electrode layers 26 and 36, the piezoelectric layers 24 and 34, and the lower electrode layers 22 and 32 are patterned into a desired configuration. The patterning may be performed by, for example, photolithography and etching technique.

By the steps described above, the driving sections 20 each having the lower electrode 22, the piezoelectric layer 24 and the upper electrode 26, and the detection sections 30 each having the lower electrode 32, the piezoelectric layer 34 and the upper electrode 36 are formed.

Then, the base layer 5 is patterned into a desired configuration. The patterning may be performed by, for example, photolithography and etching technique.

The base layer 5, the lower electrode layers 22 and 32, the piezoelectric layers 24 and 34 and the upper electrode layers 26 and 36 may be patterned individually upon formation of each of the layers, or patterned upon formation of each set of plural ones of the layers.

(3) Next, the semiconductor layer 8 of the base substrate 9 is patterned into a desired configuration, thereby forming a semiconductor section 4, a vibration section 10 and an opening section 42. The semiconductor section 4 and the vibration section 10 may be obtained by cutting through the semiconductor layer 8 to form the opening section 42 that exposes the insulation layer 6. The semiconductor layer 8 may be patterned using, for example, lithography technique and etching technique. As the etching technique, for example, a dry etching method or a wet etching method may be used. In this etching step, the insulation layer 6 may be used as an etching stopper layer. In other words, when etching the semiconductor layer 8, the etching rate of the insulation layer 6 is lower than the etching rate of the semiconductor layer 8.

(4) Next, a part of the insulation layer 6 is removed in the portion exposed through the opening section 42, whereby a void section 80 is formed at least below the vibration section 10, as shown in FIG. 1-FIG. 3. The void section 80 is formed at a position where the vibration section 10 can flexurally vibrate in a state in which mechanical restraining force against the free ends 141 of the vibration section 10 does not exist (to be described below). The void section 80 may be formed, for example, below the end section of the semiconductor section 4, the vibration section 10 and the opening section 42. When the insulation layer 6 is composed of silicon oxide, the insulation layer 6 can be removed by, for example, a wet etching method using hydrofluoric acid. In this etching step, the vibration section 10 and the semiconductor section 4 can be used as a mask, and the substrate 2 can be used as an etching stopper layer. In other words, when etching the insulation layer 6, the etching rate of the vibration section 10, the semiconductor section 4 and the substrate 2 is lower than the etching rate of the insulation layer 6.

(5) By the steps described above, the opening section 42 and the void section 80 are provided, whereby the mechanical restraining force on the free ends 141 of the vibration section 10 is eliminated, and the vibration section 10 can freely vibrate.

(6) By the steps described above, the angular rate sensor 100 in accordance with the present embodiment is formed as shown in FIG. 1-FIG. 3.

3. According to the H-letter shaped piezoelectric vibration device 90 of the angular rate sensor 100 in accordance with the present embodiment, its resonance frequency depends on the thickness of the vibration section 10. Therefore, according to the piezoelectric vibration device 90, the resonance frequency can be adjusted by adjusting the thickness of the vibration section 10. For example, in the case of a vibration section having a tuning fork shape, its resonance frequency depends on the width of the vibration section. Therefore, in the case of a tuning fork shape vibration section, it is possible to lower the resonance frequency by narrowing the width of the vibration section. But in this case, there may be a limitation in the processing technology. In contrast, according to the H-letter shaped piezoelectric vibration device 90 in accordance with the present embodiment, it is possible to lower its resonance frequency by reducing the thickness of the vibration section 10 (semiconductor section 8). Therefore, a desired resonance frequency can be obtained regardless of the limitation in the processing technology. In other words, the angular rate sensor 100 having the H-letter shaped piezoelectric vibration device 90 in accordance with the embodiment can be made smaller in size than, for example, a tuning fork shaped angular rate sensor, and can be driven at a desired resonance frequency (for example, at several tens kHz).

Figure 6:
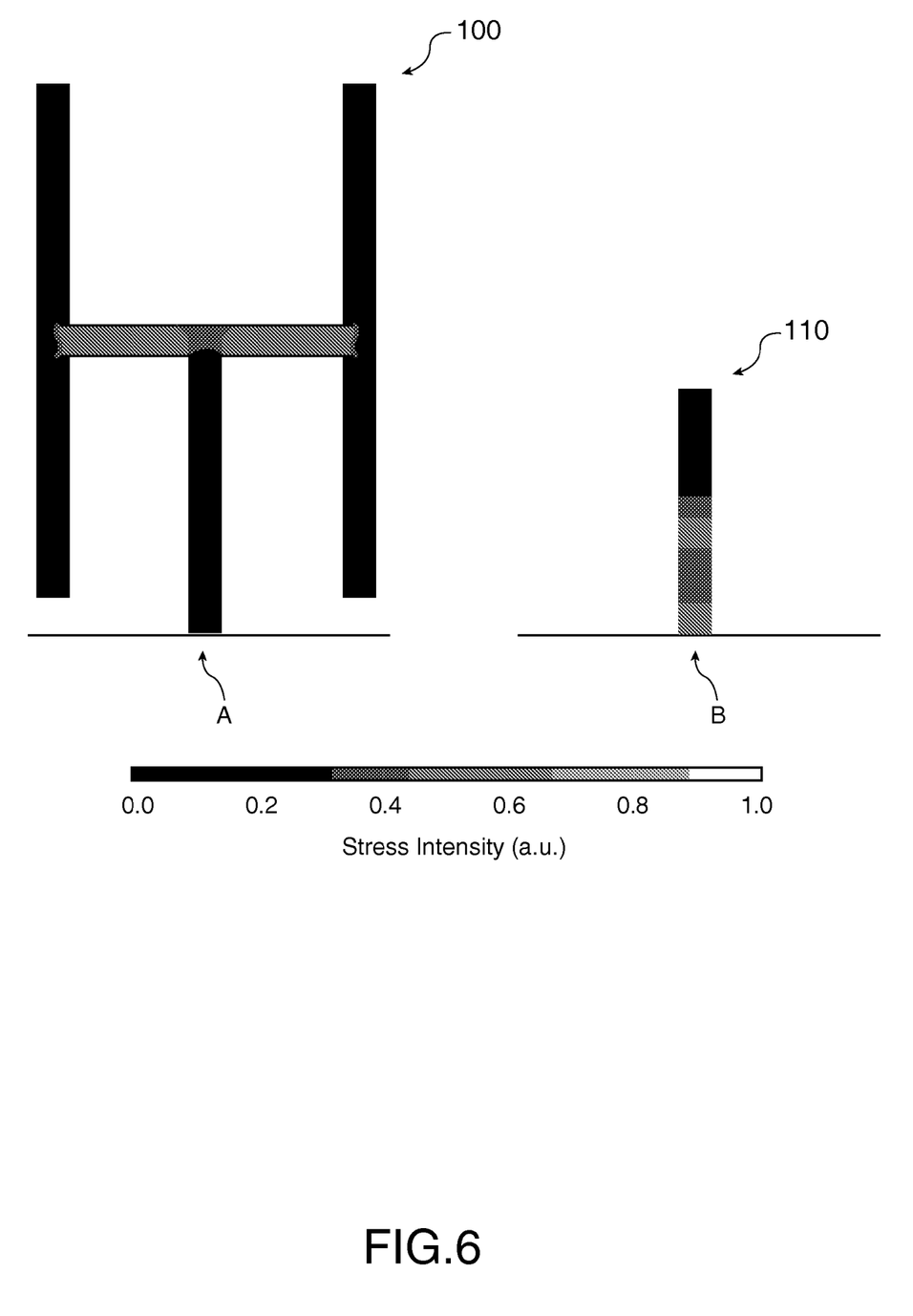
FIG. 6 shows a simulation result of stress in an angular rate sensor in a resonance node.

Also, according to the H-letter shaped piezoelectric vibration device 90 of the angular rate sensor 100 in accordance with the embodiment, stress does not concentrate at a connection section (more specifically, at the fixed end 10a of the vibration section 10) between the vibration section 10 and the base substrate 1 (more specifically, the semiconductor section 4), such that a high Q value can be obtained. FIG. 6 shows a result of simulation of stress in the angular rate sensor 100 in a resonance mode. FIG. 6 also shows a result of simulation of stress in a unimorph type angular rate sensor 110 (comparison example) having a vibration section formed from one beam. The unit of stress intensity shown in FIG. 6 is a normalized arbitrary unit (a.u.). As shown in FIG. 6, it is observed that the stress at the connection section A between the vibration section and the base substrate in the H-letter shape angular rate sensor 100 is considerably smaller than the stress at the connection section B between the vibration section and the base substrate in the unimorph type angular rate sensor 110. The above is believed to be caused by the following reason.

As described above, in the H-letter shape angular rate sensor 100, each two of the four cantilever sections 14a-14d are symmetrical through the center lines 12a and 12b in the first support section 12, and each two of the four cantilever sections can be flexurally vibrate in opposite phases. By this, it is believed that stresses applied to the center point 12c of the first support section 12 are mutually offset, and therefore the stress applied adjacent to the center point 12c becomes smaller. Therefore, it is believed that, by connecting the end point 12d that is located in the shortest distance from the center point 12c of the first support section 12 and the base substrate 1 (more specifically, the semiconductor section 4) with the second support section 16, the stress at the connection section A between the vibration section 10 and the base substrate 1 can be made very small.

Also, according to the piezoelectric vibration device 90 of the angular rate sensor 100 in accordance with the present embodiment, the thickness of the vibration section 10 is the same as that of the semiconductor section 4 of the base substrate 1 (for example, SOI substrate), such that the thickness of the vibration section 10 can be made very thin (4 μm or less, for example). By this, in the piezoelectric vibration device 90 that is driven at a desired resonance frequency, the length of the vibration section 10 (more specifically, each of the cantilever sections 14a-14d) can be shortened. In other words, the angular rate sensor 100 in accordance with the present embodiment having the piezoelectric vibration device 90 can be reduced in size. For example, when using a resonance frequency at 32 kHz, the thickness of the vibration section 10 can be reduced to 4 μm or less, the length of each of the cantilever sections 14a-14d to 400 μm or less, and the package length of the angular rate sensor 100 to 1 mm or less.

A concrete example of the angular rate sensor 100 in accordance with the embodiment is as follows.

The thickness of the insulation section 3 is 1 μm, the thickness of the lower electrodes 22 and 32 is 0.1 μm, the thickness of the piezoelectric layers 24 and 34 is 1 μm, the thickness of the upper electrodes 26 and 36 is 0.1 μm, the thickness of the driving section 20 is 1.2 μm, the thickness of the detection section 30 is 1.2 μm, and the thickness of the semiconductor section 4 and the vibration section 10 is 4 μm. Also, the beam length of each of the cantilever sections 14 is 400 μm, and the beam width is 50 μm. The length of the first support section 12 is 250 μm, and its width is 50 μm. Also, as viewed in a plan view, the long side of the inner edge of the rectangular frame formed by the semiconductor section 4 is 950 μm in length, and the short side is 350 μm in length. The flexural vibration resonance frequency of the angular rate sensor 100 having the structure described above, obtained by simulation conducted by solving an equation of motion using a finite element method, was 32 kHz. The sensitivity of the angular rate sensor 100 obtained by simulation was 0.1 mV/deg/sec.

According to the angular rate sensor 100 in accordance with the present embodiment, by using a SOI substrate as the base substrate 1, the angular rate sensor 100 can be integrated with semiconductor circuits formed in and on the semiconductor section 4, thereby forming an electronic apparatus (an angular rate sensor module). As a result, the size of the module package can be reduced.

According to the angular rate sensor 100 in accordance with the present embodiment, by using a SOI substrate as the base substrate 1, the angular rate sensor 100 can be integrated with driving circuits formed in and on the semiconductor section 4. As a device using a SOI substrate, its operation voltage can be lowered. Therefore, by utilizing the angular rate sensor 100 in accordance with the present embodiment, a one-chip angular rate sensor module with low power consumption can be realized.

The angular rate sensor 100 in accordance with the present embodiment, and an independent IC (integrated circuit) chip that includes driving circuits and detection circuits for the angular rate sensor 100 may be packaged together to obtain an angular rate sensor module in accordance with an embodiment of the invention.

4. Next, angular rate sensors in accordance with modified examples of the embodiment are described with reference to the accompanying drawings. Features different from those of the angular rate sensor 100 described above (hereafter referred to as the "example of angular rate sensor 100") are described below, and description of similar features is omitted.

Figure 7:
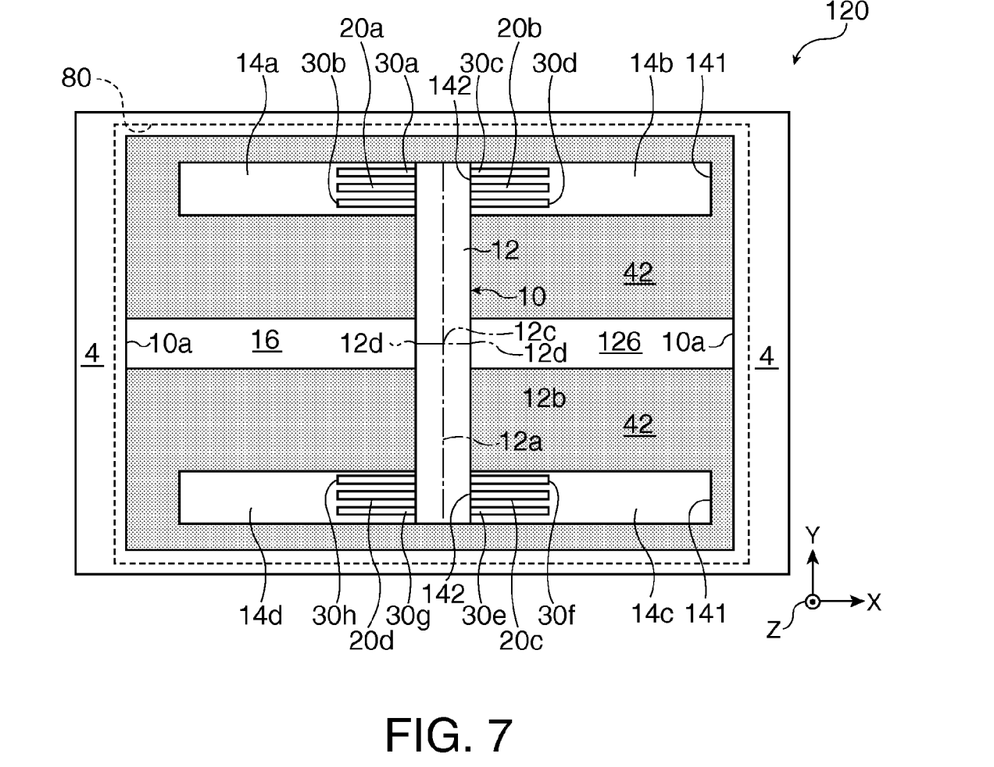
FIG. 7 is a schematic plan view of an angular rate sensor in accordance with a first modified example.

(1) First, a first modified example is described. FIG. 7 is a schematic plan view of an angular rate sensor 120 in accordance with the modified example.

In the example of angular rate sensor 100 described above, the end point 12d that is located in the shortest distance from the center point 12c of the first support section 12 and the semiconductor section 4 are connected to each other by a single second support section 16. In accordance with the modified example, another end point 12d that is located in the shortest distance from the center point 12c of the first support section 12 and the semiconductor section 4 may be connected to each other by another second support section 126. More specifically, in accordance with the present modified example, the vibration section 10 is connected to the semiconductor section 4 at two places. One of the second support sections 16 and the other of the second support sections 126 are symmetrical, in a plan view, through one of the center lines 12a of the first support section 12. The other second support section 126 may have, for example, a cuboid configuration.

Figure 8:
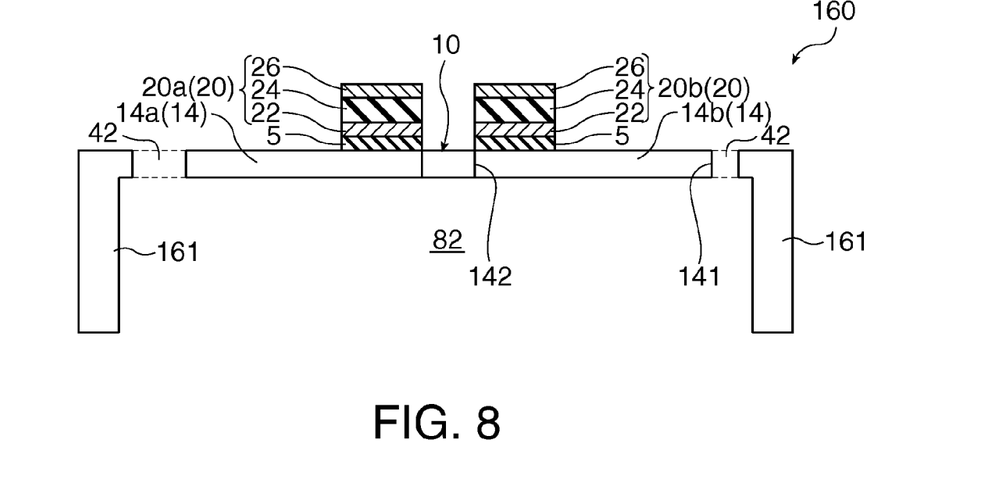
FIG. 8 is a schematic cross-sectional view of an angular rate sensor in accordance with a second modified example.

(2) Next, a second modified example is described. FIG. 8 is a schematic cross-sectional view of an angular rate sensor 160 in accordance with the second modified example.

In the example of angular rate sensor 100 described above, the base substrate 1 is formed from, for example, a SOI substrate. In accordance with the second modified example, the base substrate 161 may be formed from a semiconductor substrate composed of silicon. The angular rate sensor 160 in accordance with the second modified example is provided with an opening section (second opening section) 82 formed therein. The opening section 82 may be provided, for example, at the same position as that of the void section 80 of the example of angular rate sensor 100. The opening section 82 may be, for example, a portion of the base substrate 161, and may be formed by removing a portion of the base substrate 161 from the back surface of the base substrate 161 to the lower surface of the vibration section 10.

(3) The modified examples described above are only examples, and the invention is not limited to those examples. For example, the modified examples may be appropriately combined.

5. The embodiments of the invention are described above in detail. However, those skilled in the art should readily understand that many modifications can be made without departing in substance from the novel matter and effects of the invention. Accordingly, those modified examples are also deemed included in the scope of the invention.

For example, the angular rate sensors in accordance with the embodiments of the invention described above are applicable to electronic apparatuses, such as, digital cameras, car navigation systems, man navigation systems and the like.

What is claimed is:

1. An angular rate sensor comprising:
   a piezoelectric vibration device; and
   a detection section,
   wherein the piezoelectric vibration device includes a base substrate, a vibration section having a fixed end affixed to the base substrate and a free end that does not contact the base substrate, and a driving section formed above the vibration section for generating flexural vibration of the vibration section;
   the vibration section has a first support section, four (first-fourth) cantilever sections supported by the first support section, and a second support section that supports the first support section and equipped with the fixed end;
   the first support section has a first center line and a second center line that are orthogonal to each other;
   the first cantilever section and the second cantilever section are symmetrical to each other through a first center line of the first support section in a plan view;
   the third cantilever section and the fourth cantilever section are symmetrical to each other through the first center line of the first support section in a plan view;
   the first cantilever section and the fourth cantilever section are symmetrical to each other through the second center line of the first support section in a plan view;
   the second cantilever section and the third cantilever section are symmetrical to each other through the second center line of the first support section in a plan view;
   the driving section includes a lower electrode for the driving section, a piezoelectric layer for the driving section formed above the lower electrode for the driving section, and an upper electrode for the driving section formed above the piezoelectric layer for the driving section;
   the detection section is formed above the vibration section for detecting an angular rate of rotation applied to the vibration section, and has a lower electrode for the detection section, a piezoelectric layer for the detection section formed above the lower electrode for the detection section, and an upper electrode for the detection section formed above the piezoelectric layer for the detection section;
   during operation of the angular rate sensor, the first and second cantilever sections are flexurally vibrated normal to a plane including the first and second center lines in mutually opposite phases, the second and third cantilever sections are flexurally vibrated normal to the plane including the first and second center lines in mutually opposite phases, and the third and fourth cantilever sections are flexurally vibrated normal to the plane including the first and second center lines in mutually opposite phases; and
   the first to fourth cantilever sections are flexurally vibrated in a direction of the first center line according to an angular velocity of rotation generated about the second center line.

2. An angular rate sensor according to claim 1, wherein the first support section and the four cantilever sections form a letter H shape in a plan view, and the first support section and the second support section form a letter T shape in a plan view.

3. An angular rate sensor according to claim 1, wherein the first cantilever section and the second cantilever section are connected to one end section of the first support section, and the third cantilever section and the fourth cantilever section are connected to the other end section of the first support section.

4. An angular rate sensor according to claim 1, wherein the second support section is connected to an end point of the first support section which is located in a shortest distance from a center point of the first support section in a plan view.

5. An angular rate sensor according to claim 1, wherein each of the first support section, the cantilever sections and the second support section has a cuboid configuration.

6. An angular rate sensor according to claim 1, wherein the detection section includes a pair of detection sections formed above each of the cantilever sections, and the driving section is formed above each of the cantilever sections between the pair of detection sections.

7. An angular rate sensor according to claim 1, wherein the base substrate includes a substrate, an insulation section formed above the substrate, and a semiconductor section formed above the insulation section, wherein the vibration section is formed from a semiconductor that is the same semiconductor composing the semiconductor section.

8. An angular rate sensor according to claim 1, wherein the base substrate is a SOI (silicon on insulator) substrate.

9. An angular rate sensor according to claim 1, wherein the base substrate is a semiconductor substrate, and the vibration section is formed from a semiconductor that is the same semiconductor composing the semiconductor substrate.

10. An electronic device comprising the angular rate sensor recited in claim 1.

* * * * *